United States Patent
Beall

[19]

[11] Patent Number: 5,862,848
[45] Date of Patent: Jan. 26, 1999

[54] HINGE MORTISING FIXTURE

[76] Inventor: Jerrold R. Beall, 541 Swans Rd., NE., Newark, Ohio 43055

[21] Appl. No.: 899,131

[22] Filed: Jul. 23, 1997

[51] Int. Cl.$^6$ .................................. B27F 5/00; B27C 5/00
[52] U.S. Cl. ......................... 144/372; 144/27; 144/144.1; 144/84; 33/197
[58] Field of Search ................................... 409/125, 130; 144/27, 137, 144.1, 372, 82, 83, 84; 33/197

[56] References Cited

U.S. PATENT DOCUMENTS

| | | | |
|---|---|---|---|
| 2,355,603 | 8/1944 | Zern | 144/27 |
| 2,427,081 | 9/1947 | Zern | 144/27 |
| 2,605,790 | 8/1952 | Schwarzer | 144/27 |
| 2,801,655 | 8/1957 | Zern | 144/27 |
| 2,894,353 | 7/1959 | Zern | 144/27 |

OTHER PUBLICATIONS

"Pro–Template Systems" on p. 150 of Woodcraft® May 1997 catalog.

Undated Professional Template Systems instructions obtained by applicant with item #126844 (PTS#2(B)) ordered by applicant from Woodcraft® May 1997 catalog.

*Primary Examiner*—W. Donald Bray
*Attorney, Agent, or Firm*—John S. Pratt; Kilpatrick Stockton LLP

[57] ABSTRACT

A mortising fixture that utilizes interchangeable templates to guide an electric router fitted with a template guide bushing. The templates are held in a fixture plate that is positioned on the box or lid surface to be mortised and which plate is clamped to the lid or box in a position that is determined by (1) a fixture fence that rests against the back edge of the lid or box and (2) a adjustable end stop that indexes against the lid or box sides. One box mortise and the opposite lid mortise are made with the end stop screw block in one position on the fixture plate, and the other two mortises are made after flipping the fixture block and adjusting screw to a corresponding position on the other side of the plate.

7 Claims, 3 Drawing Sheets

HINGE MORTISING FIXTURE

FIELD OF THE INVENTION

This invention relates to router templates and guides, particularly including such devices for cutting mortises for inletting hinges.

BACKGROUND OF THE INVENTION

A wide of variety hinge types, shapes and styles have long been used to attach lids to boxes used, for instance, for jewelry, stationary and cigars. It is typically desirable to inlet hinge parts in one or both of the lid and box to enable the lid to close tightly and to make hinge installation attractive. Such inletting can be accomplished by tracing hinge parts on the box or lid in which the parts are to be inlet and removing lid or box material with a router or chisels or operating an electric router free-hand. Doing so is time consuming, and successfully doing so requires substantial skill. The small sizes of many box hinges and the delicate nature of box components in which they must be inlaid make the mortising task particularly difficult.

The challenges described above associated with cutting mortises to inlet hinge components in boxes and lids have resulted in utilization of various shop-built and commercially available templates, jigs and fixtures. Many of these jigs and fixtures suffer from similar shortcomings, including lack of adjustability, difficulty in use, and in particular, difficulty (if not impossibility) of accommodating more than one size or shape of hinge.

SUMMARY OF THE INVENTION

The mortising fixture of the present invention utilizes interchangeable templates to guide an electric router fitted with a (typically ⅜") template guide bushing. The templates are held in a fixture plate that is positioned on the box or lid surface to be mortised and which plate is clamped to the lid or box in a position that is determined by (1) a fixture fence that rests against the back edge of the lid or box and (2) a adjustable end stop that indexes against the lid or box sides. One box mortise and the opposite lid mortise are made with the end stop screw block in one position on the fixture plate, and the other two mortises are made after flipping the fixture block and adjusting screw to a corresponding position on the other side of the plate.

The present invention thus provides an economical fixture that, accommodates the use of inexpensive interchangeable templates, facilitates inletting a wide variety of shapes and sizes of hinges. These and other advantages of the present invention will be readily understood by one skilled in the art by reference to accompanying drawings, the following description of those drawings and the attached claims.

DETAILED DESCRIPTION OF THE DRAWINGS

Figure 1:
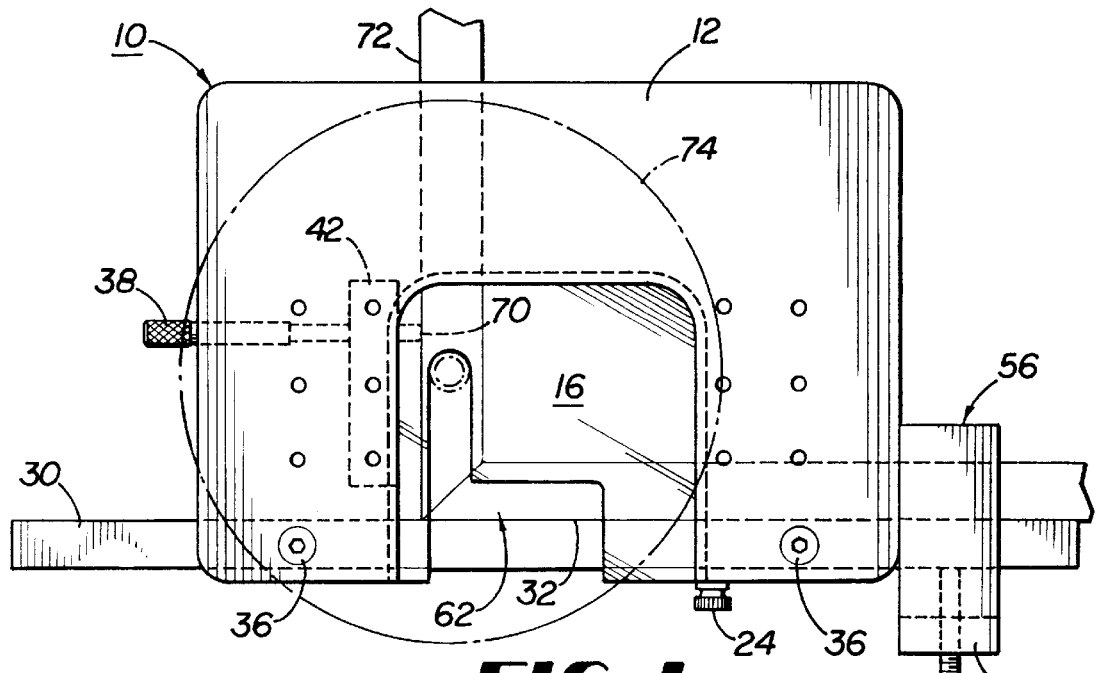
FIG. 1 is a top plan view of the hinge mortising fixture of the present invention shown positioned for use on a corner of a box.

The hinge mortising fixture 10 of the present invention may be readily understood by reference to the figures, in which a fixture plate 12 that may be generally rectangular in shape has a generally square quadrant removed so that interchangeable, generally square templates 16 and 18 may be received in a groove 20 in the portion of the plate 12 edge 22 that defines the missing quadrant. Template 16 or 18 is held in place by a thumb screw 24 that is received in a threaded hole 26 in the edge 28 of fixture plate 12 adjacent to the groove 20. As may be readily appreciated by reference to FIGS. 1 and 5, the location of mortising fixture 10 relative to the back 32 of the lid or box 34 being mortised is established by a fence 30 that is permanently attached to plate 12 by, for instance, passing two screws 36 through the plate 12 and into the fence 30.

Figure 2:
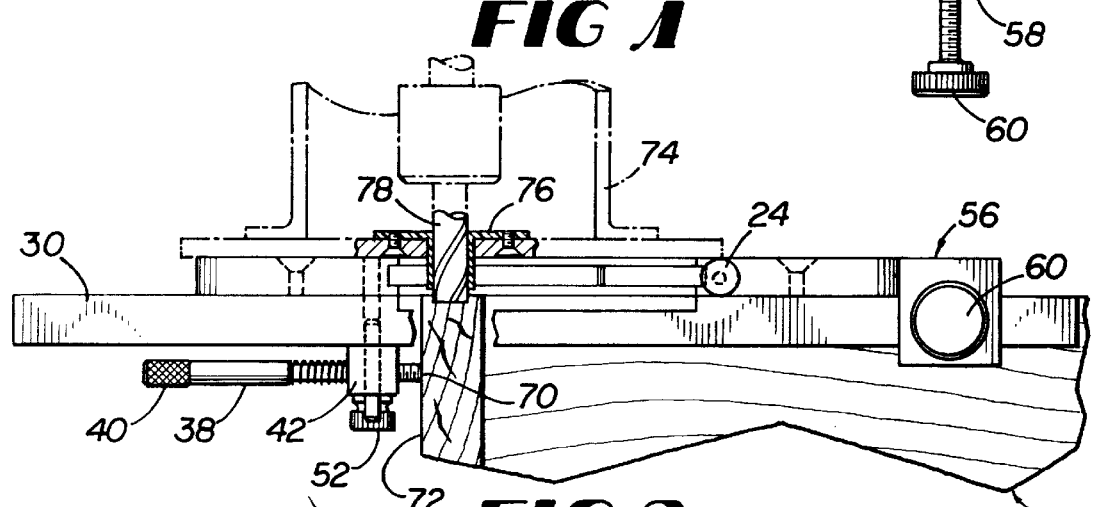
FIG. 2 is a front elevation view partially in section, of the hinge mortising fixture shown in FIG. 1 with a portion of the fence broken away and with portions of a router shown in place.

As will be appreciated to reference to FIGS. 1 and 2, the lateral position of mortising fixture 10 on box or lid 34 is established by contact with a positioning screw 38 that may be rotated by contact with knurling 40 on one end of the screw. Screw 38 is threaded through lateral positioning block 42 that is temporarily positioned on the underside of fixture plate 12 by locating two alignment pins 44 (that protrude through opposed faces 46 of block 42) in a selected pair of pin receiving holes 48 in the underside 50 of fixture plate 12. Block 42 is held in position by passing a thumb screw 52 through block 42 and into a threaded thumbscrew hole 54 in the underside 50 of fixture plate 12. By locating pairs of pin receiving holes 48 and corresponding thumbscrew holes 54 in different lateral positions on the underside 50 of fixture plate 12, it is possible to make gross adjustments by repositioning block 42. Significantly, pairs of pin receiving holes 48 and corresponding thumbscrew holes 54 are positioned in fixture plate 12 in symmetrical location equally distant from either side of the template-receiving cut-out 14 in fixture plate 12. Fine lateral adjustments are made by rotating positioning screw 38. As is shown in each of FIGS. 1,2 and 5, mortising fixture 10 is temporarily fixed in position on a box or lid 34 utilizing a clamp 56 that maybe a C clamp or, as is illustrated, a U shaped section of bar 58 into which a thumbscrew 60 is threaded to apply clamping pressure to a portion of the fence 30 that extends beyond fixture plate 12.

Figure 3:
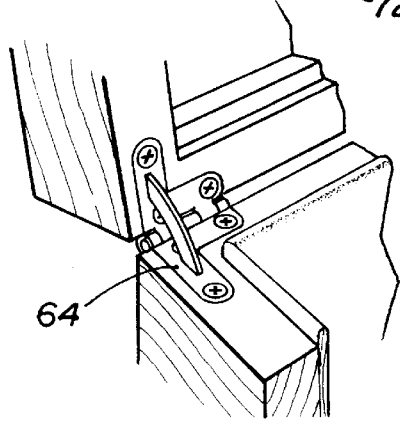
FIG. 3 is a perspective view of a quadrant hinge shown installed on a box and lid.

As will be appreciated by comparison of FIGS. 1 and 3, a template 16 having a generally L-shaped cutout 62 is utilized to cut the mortise required for a quadrant hinge 64, as is illustrated in FIG. 3.

Figure 4:
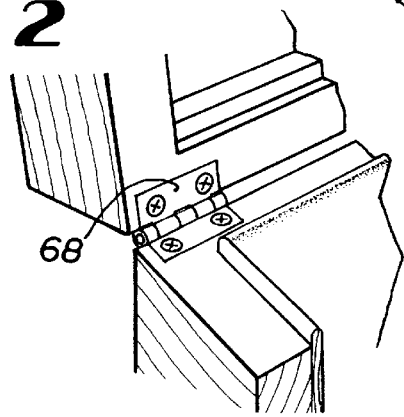
FIG. 4 is a perspective view of butt hinge installed on a box and lid.

Similarly, a generally rectangular cut-out 66 like that shown in template 18 may be used to produce the mortise required to install a butt hinge 68 as is illustrated in FIG. 4.

Figure 5:
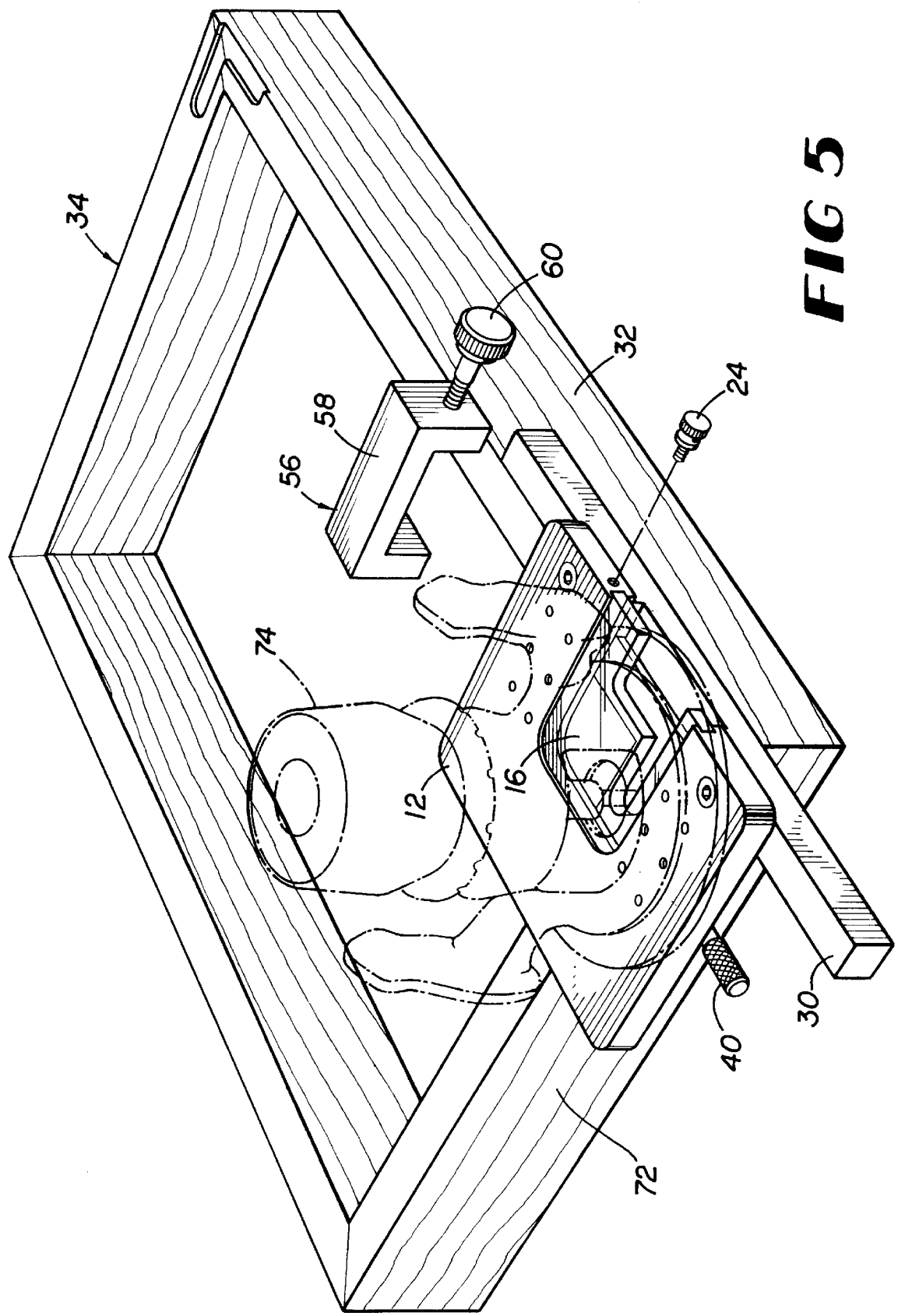
FIG. 5 is a perspective view of the hinge mortising fixture of the present invention shown in use on a lid corner, together with a router shown in broken lines.

As will be appreciated by reference to the figures, the mortises necessary to inlet hinges (such as quadrant hinges 64) in a box and its corresponding lid utilizing fixture 10 are accomplished as follows. An appropriate template such as template 16 is slid into the template receiving cut-out 14 in fixture plate 12 and locked in place with thumbscrew 24. Fixture 10 is then positioned on one corner of either the box or lid 34, with its fence 30 in contact with the back 32 of the box or lid 34, and the fixture 10 is slid back and forth laterally until the template is properly positioned laterally relative to the box or lid 34. Clamp 56 is then used as shown in FIGS. 1, 2 and 5 to temporarily lock the fixture 10 in position. Thumbscrew 38 is then advanced until the end 70 of thumbscrew 38 contacts the box or lid 34 side 72. A router 74 having a guide bushing 76 and a router cutter (preferably a spiral down-cut router bit) 78 adjusted to cut to the desired depth is then positioned atop hinge mortising fixture 10 with the guide bushing within the recess 62 of template 16 and is manipulated to remove material from the box or lid 34.

Figure 6:
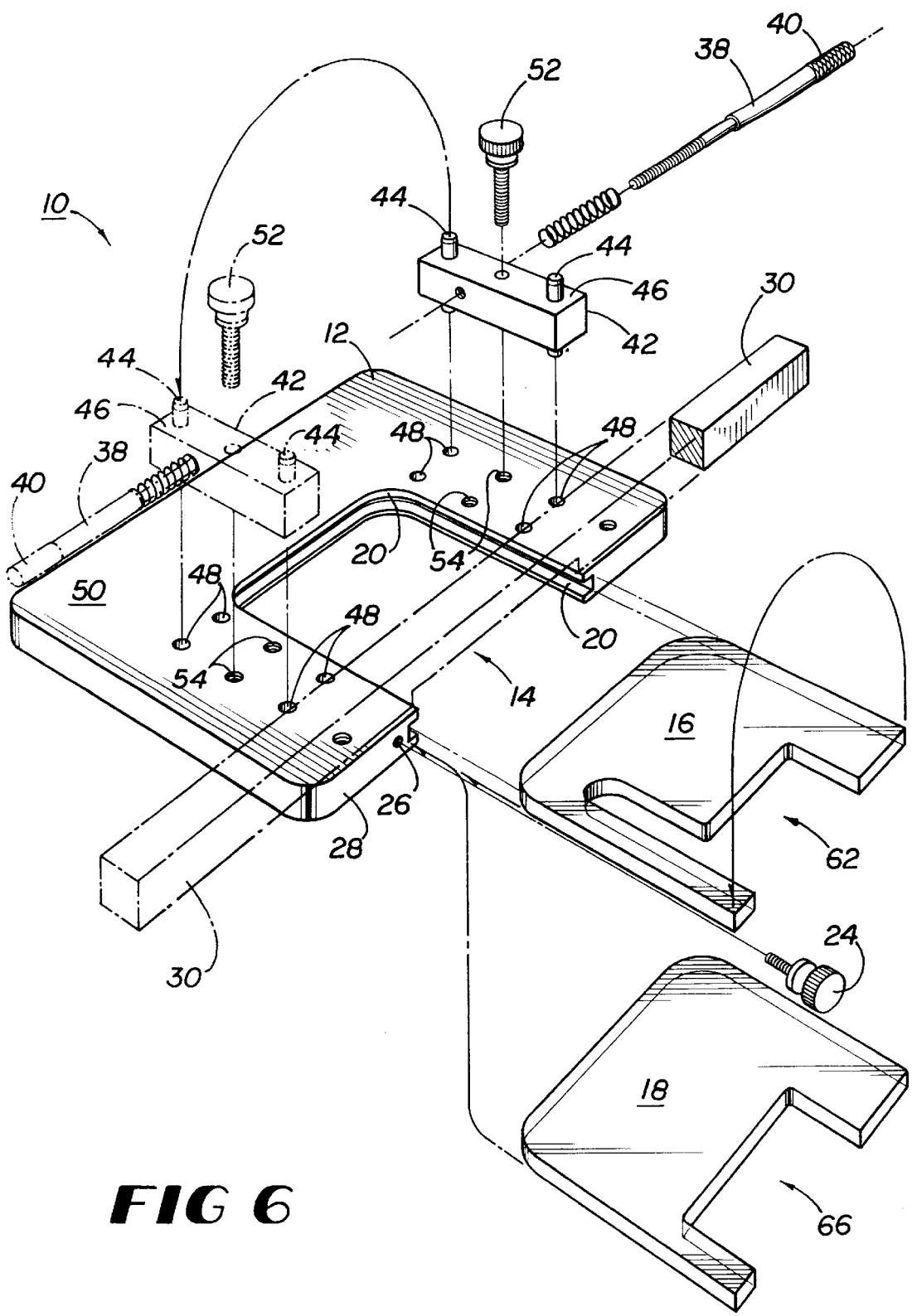
FIG. 6 is an exploded perspective view of the underside of the hinge mortising fixture of the present invention with a portion of the fixture fence shown in broken lines.

Mortising fixture 10 is then moved to the opposite position on the other of the lid or box 34 and the above-described operation is repeated. Block 42 is then removed and flipped to the opposite side of fixture plate 12 as is suggested in FIG. 6, and the remaining two mortises in the lid and box may be cut.

A variety of materials can be used for each of the components of the present invention. Among those, it may be desirable to use aluminum for block 42, fence 30, and clamp 56. Thumbscrews 38 and 60 may be fabricated of plastic, brass and steel among other materials. Thumbscrew 24 may be brass, steel or nylon. Fixture plate 12 may desirably be aluminum, steel or any of the wide variety of plastic materials including polycarbonate and acrylic. The templates 16 and 18 may likewise be made of a variety of material, including aluminum and plastics. Clear plastics such as polycarbonate or acrylic are easily machined to the desired shapes and make it easy to see underlying structures, which is desirable when the lateral position on the fixture 10 is being established. Alignment pins 44 may be made of steel.

As will be understood by those skilled in the art, the components of the present invention can be made of other materials, and the dimensions and configurations of the components may also be varied and modified without departing from the scope of the present invention, as described in the preceding text, the accompanying drawings, and the following claims.

I claim:

1. A mortising fixture for use with an electric router to cut a mortise in a work piece having at least two sides, comprising a template for temporary positioning on the work piece to guide the router, a fence positioned relative to the template for establishing the position of the template relative to one side of the work piece and a stop positionable relative to the template for establishing the position of the template relative to a second side of the work piece, wherein the stop may be attached to the fixture in either of at least two positions.

2. A mortising fixture for use with an electric router to cut a mortise in a work piece having at least two sides, comprising a template for temporary positioning on the work piece to guide the router a fence positioned relative to the template for establishing the position of the template relative to one side of the work piece and a stop positionable relative to the template for establishing the position of the template relative to a second side of the work piece, wherein the stop is adjustable and comprises a block positionable relative to the template in at least two predetermined locations and a screw positioned within the block.

3. A mortising fixture for use with an electric router to cut a mortise in a work piece having at least two sides, comprising a template for temporary positioning on the work piece to guide the router, a fence positioned relative to the template for establishing the position of the template relative to one side of the work piece and a stop positionable relative to the template for establishing the position of the template relative to a second side of the work piece, wherein the stop is adjustable and further comprises a plate to which each of the template, fence and stop are attached, and wherein a block is attachable to the plate in at least two locations by positioning portions of at least two pins fixed in the block in holes located in the plate.

4. The fixture of claim 3, wherein the plate includes means to receive interchangeable templates.

5. A hinge mortising fixture, comprising a fixture plate having a template-receiving recess, a locking screw for locking a template in the template-receiving recess, a fence attached to the plate for establishing the position of the plate relative to a first side of a work piece, a stop attachable to the plate in multiple positions for establishing the lateral position of the fixture relative to the work piece, and a clamp for temporarily fixing the position of the fixture on a work piece.

6. The fixture of claim 5, wherein the stop comprises a reversible block having a plurality of position-establishing pins, each end of which pins protrude from an opposed face of the block, and a thumbscrew positioned within the block orthogonal to the pins for establishing a stop defined by an end of the thumbscrew.

7. A method for cutting hinge mortises in a box and matching lid, comprising the steps of:

(a) positioning a template-carrying mortising fixture on a first box corner by reference to a fence and stop attached to the mortising fixture on one side of the template, (b) cutting a mortise in the first box corner utilizing an electric router having a guide bushing guided by the template, (c) repositioning the mortising fixture on a second corner opposite the first corner and on the other of the box or lid by reference to the fence and stop, (d) cutting a mortise in the second corner utilizing the router guided by the template, (e) repositioning the stop on the fixture on the other side of the template, (f) repositioning the mortising fixture on a third corner of either the lid or box, (g) cutting a mortise in the third corner utilizing the router guided by the template, (h) repositioning the mortising fixture on a fourth corner of the other of the lid or box having the third corner, and (i) cutting a mortise in the fourth corner utilizing the router guided by the template.

* * * * *